United States Patent
Tonge et al.

(10) Patent No.: US 10,614,257 B2
(45) Date of Patent: Apr. 7, 2020

(54) PARALLEL LINEAR COMPLEMENTARITY SOLVER FOR RIGID BODY DYNAMICS

(71) Applicant: NVIDIA Corporation, Santa Clara, CA (US)

(72) Inventors: Richard Tonge, Saint Louis, MO (US); Feodor Benevolenski, Moscow (RU); Andrey Voroshilov, Moscow (RU)

(73) Assignee: NAVIDIA Corporation, Santa Clara, CA (US)

( * ) Notice: Subject to any disclaimer, the term of this patent is extended or adjusted under 35 U.S.C. 154(b) by 278 days.

(21) Appl. No.: 13/774,906

(22) Filed: Feb. 22, 2013

(65) Prior Publication Data

US 2014/0244221 A1    Aug. 28, 2014

(51) Int. Cl.
| | | |
|---|---|---|
| G06F 7/60 | (2006.01) | |
| G06F 17/10 | (2006.01) | |
| G06F 17/50 | (2006.01) | |
| G06F 30/20 | (2020.01) | |

(52) U.S. Cl.
CPC .......... *G06F 30/20* (2020.01); *G06F 2217/10* (2013.01)

(58) Field of Classification Search
None
See application file for complete search history.

(56) References Cited

U.S. PATENT DOCUMENTS

| 7,079,145 B2 | 7/2006 | Tonge et al. |
| 7,353,149 B2 * | 4/2008 | Strunk et al. ............. 703/7 |
| 2005/0162433 A1 | 7/2005 | Tonge et al. |
| 2005/0165873 A1 * | 7/2005 | Zhang .................. G06F 17/11 708/446 |
| 2010/0094608 A1 | 4/2010 | Oh et al. |
| 2011/0208492 A1 * | 8/2011 | Xu ...................... G06F 17/5086 703/2 |

OTHER PUBLICATIONS

Baraff, An Introduction to Physically Based Modeling: Rigid Body Simulation II—Nonpenetration Constraints, 1997, Carnegie Mellon University, pp. D31-D68.*
Bridson et al., Robust Treatment of Collisions, Contact and Friction for Cloth Animation, 2002, Stanford University, pp. 1-10.*
Kleppmann, Simulation of colliding constrained rigid bodies, Apr. 2007, University of Cmabridge, pp. 1-65.*

(Continued)

*Primary Examiner* — Kibrom K Gebresilassie
*Assistant Examiner* — Bernard E Cothran
(74) *Attorney, Agent, or Firm* — Shook Hardy & Bacon L.L.P.

(57) ABSTRACT

A system and method for solving linear complementarity problems for rigid body simulation is disclosed. The method includes determining one or more contact constraints affecting an original object having an original mass. The method includes splitting the original object by a total number of the contact constraints into a plurality of sub-bodies. The method includes assigning a contact constraint to a corresponding sub-body. The method further includes solving contact constraints in isolation for each sub-body. The method also includes enforcing fixed joint constraints exactly, such that positions and orientations of each sub-body are identical.

23 Claims, 8 Drawing Sheets

(56) References Cited

OTHER PUBLICATIONS

Baraff, An Introduction to Physically Based Modeling: Rigid Body Simulation II-Nonpenetration Constraints, 1997, pp. D32-D68.*
Bridson et al, Robust Treatment of Collisions, Contact and Friction for Cloth Animation, pp. 1-10, 2002.*
Parker et al., Real-Time Deformation and Fracture in a Game Environment, 2009, ACM, pp. 156-166 (Year: 2009).*
Harada, A Parallel Constraint Solver for a Rigid Body Simulation, 2011, Advanced Micro Devices, Inc., pp. 1-2 (Year: 2011).*
O'Brien et al., Graphical Modeling and Animation of Brittle Fracture, 1999, ACM, pp. 137-146 (Year: 1999).*
Raghupathi, Towards Robust Animation of Complex Objects in Interaction, 2006, HAL Archives-Ouvertes, pp. 1-148.
Allard, J., et al. 2010. "Volume contact constraints at arbitrary resolution." In ACM SIGGRAPH 2010 papers, ACM, New York, NY, USA, SIGGRAPH '10, 82:1-82:10.
Anitescu, M., et al. 1997. "Formulating dynamic multi-rigid-body contact problems with friction as solvable linear complementarity problems." Nonlinear Dynamics 14, 231-247. 10.1023/A:1008292328909.
Anitescu, M., et al. 2010. "An iterative approach for cone complementarity problems for nonsmooth dynamics." Computational Optimization and Applications 47, 207-235. 10.1007/s10589-008-9223-4.
Ascher, U. M., et al. 1998. "Computer methods for ordinary differential equations and differential-algebraic equations." SIAM.
Baraff, D. 1989. "Analytical methods for dynamic simulation of non-penetrating rigid bodies." SIGGRAPH Comput. Graph. 23 (July), 223-232.
Baraff, D. 1991. "Coping with friction for non-penetrating rigid body simulation." In Proceedings of the 18th annual conference on Computer graphics and interactive techniques, ACM, New York, NY, USA, SIGGRAPH '91, 31-41.
Baraff, D. 1994. "Fast contact force computation for nonpenetrating rigid bodies." In Proceedings of the 21st annual conference on Computer graphics and interactive techniques, ACM, New York, NY, USA, SIGGRAPH '94, 23-34.
Catto, E. 2005. "Iterative dynamics with temporal coherence." Presented at the Game Developers Conference.
Cline, M. B., et al. 2003. "Post-stabilization for rigid body simulation with contact and constraints." In ICRA, IEEE, 3744-3751.
Daviet, G., et al. 2011. "A hybrid iterative solver for robustly capturing coulomb friction in hair dynamics." In Proceedings of the 2011 SIGGRAPH Asia Conference, ACM, New York, NY, USA, SA '11, 139:1-139:12.
Dostal, Z., et al. 2005. "Minimizing quadratic functions subject to bound constraints with the rate of convergence and finite termination." Computational Optimization and Applications 30, 23-43. 10.1023/B: COAP.0000049888.80264.25.
Erleben, K. 2004. "Stable , Robust , and Versatile Multibody Dynamics Animation." PhD thesis, University of Copenhagen, Copenhagen.—Uploaded in Three Parts.
Gascón, J., et al. 2010. "Constraint-based simulation of adhesive contact." In Proceedings of the 2010 ACM SIGGRAPH/Eurographics Symposium on Computer Animation, Eurographics Association, Aire-la-Ville, Switzerland, Switzerland, SCA '10, 39-44.
Govindaraju, N. K., et al. 2003. "Cullide: interactive collision detection between complex models in large environments using graphics hardware." In Proceedings of the ACM SIGGRAPH/EUROGRAPHICS conference on Graphics hardware, Eurographics Association, Aire-la-Ville, Switzerland, Switzerland, HWWS '03, 25-32.
Guendelman, E., et al. 2003. "Nonconvex rigid bodies with stacking." In ACM SIGGRAPH 2003 Papers, ACM, New York, NY, USA, SIGGRAPH '03, 871-878.
Gustafsson, D. 2010. "Understanding game physics artefacts." In Game Physics Pearls. A K Peters, ch. 2.
Harada, T. 2007. "Real-time rigid body simulation on GPUs." In GPU gems 3. Addison-Wesley Professional, ch. 29.

Harada, T. 2009. "Parallelizing the physics pipeline: Physics simulations on the GPU." Presented at the Game Developers Conference.
Harada, T. 2011. "A parallel constraint solver for a rigid body simulation." Presented at SIGGRAPH Asia.
Harmon, D., et al. 2009. "Asynchronous contact mechanics." In ACM SIGGRAPH 2009 papers, ACM, New York, NY, USA, SIGGRAPH '09, 87:1-87:12.
Hege, H.-C., et al. 1991. "Vectorization and parallelization of irregular problems via graph coloring." In ICS, 47-56.
Heo, J.-P., et al. 2010. "Fasted: fracturingaware stable collision detection." In Proceedings of the 2010 ACM SIGGRAPH/Eurographics Symposium on Computer Animation, Eurographics Association, Aire-la-Ville, Switzerland, Switzerland, SCA '10, 149-158.
Hsu, S.-W., et al. 2010. "Piles of objects." In ACM SIGGRAPH Asia 2010 papers, ACM, New York, NY, USA, SIGGRAPH Asia '10, 155:1-155:6.
Joselli, M., et al. 2008. "A new physics engine with automatic process distribution between CPU-GPU." In Proceedings of the 2008 ACM SIGGRAPH symposium on Video games, ACM, New York, NY, USA, Sandbox '08, 149-156.
Kaufman, D. M., et al. 2005. "Fast frictional dynamics for rigid bodies." In ACM SIGGRAPH 2005 Papers, ACM, New York, NY, USA, SIGGRAPH '05, 946-956.
Kaufman, D. M., et al. 2008. "Staggered projections for frictional contact in multibody systems." In ACM SIGGRAPH Asia 2008 papers, ACM, New York, NY, USA, SIGGRAPH Asia '08, 164:1-164:11.
Kim, Y. J., et al. 2002. "Fast penetration depth computation for physically-based animation." In Proceedings of the 2002 ACM SIGGRAPH/Eurographics symposium on Computer animation, ACM, New York, NY, USA, SCA '02, 23-31.
Lacoursiere, C. 2007. "Ghosts and Machines: Regularized Variational Methods for Interactive Simulations of Multibodies with Dry Frictional Contacts." PhD thesis, Umeå University.—Uploaded in Four Parts.
Levin, D. I. W., et al. 2011. "Eulerian solid simulation with contact." ACM Trans. Graph. 30 (August), 36:1-36:10.
Liu, F., et al. 2010. "Real-time collision culling of a million bodies on graphics processing units." In ACM SIGGRAPH Asia 2010 papers, ACM, New York, NY, USA, SIGGRAPH Asia '10, 154:1-154:8.
Mirtich, B. 2000. "Timewarp rigid body simulation." In Proceedings of the 27th annual conference on Computer graphics and interactive techniques, ACM Press/Addison-Wesley Publishing Co., New York, NY, USA, SIGGRAPH '10, 193-200.
Morales, J., et al. 2008. "An algorithm for the fast solution of symmetric linear complementarity problems." Numerische Mathematik 111, 251-266. 10.1007/s00211-008-0183-5.
Müller, M., et al. 2011. "Solid simulation with oriented particles."In ACM SIGGRAPH 2011 papers, ACM, New York, NY, USA, SIGGRAPH '11, 92:1-92:10.
Murty, K. G. 1988. "Iterative methods for LCPs." In Linear Complementarity, Linear and Non-linear Programming. Helderman Verlag, ch. 9.
Parker, E. G., et al. 2009. "Real-time deformation and fracture in a game environment." In Proceedings of the 2009 ACM SIGGRAPH/EUROGRAPHICS Symposium on Computer Animation, ACM, New York, NY, USA, SCA '09, 165-175.
Pauly, M., et al. 2004. "Quasi-rigid objects in contact." In Proceedings of the 2004 ACM SIGGRAPH/Eurographics symposium on Computer animation, Eurographics Association, Aire-la-Ville, Switzerland, Switzerland, SCA '04, 109-119.
Renouf, M., et al. 2005. "Conjugate gradient type algorithms for frictional multi-contact problems: applications to granular materials." Computer Methods in Applied Mechanics and Engineering 194, 18-20, 2019—2041.
Silcowitz, M., et al. 2010. "A nonsmooth nonlinear conjugate gradient method for interactive contact force problems." The Visual Computer 26, 893-901. 10.1007/s00371-010-0502-6.

(56) References Cited

OTHER PUBLICATIONS

Stewart, D. E., et al. 1996. "An implicit time-stepping scheme for rigid body dynamics with inelastic collisions and coulomb friction." International Journal for Numerical Methods in Engineering 39, 15, 2673-2691.

Stewart, D. E. 2000. "Rigid-body dynamics with friction and impact." SIAM Review 42, 1, 3-39.

Su, J., et al. 2009. "Energy stability and fracture for frame rate rigid body simulations." In Proceedings of the 2009 ACM SIGGRAPH/Eurographics Symposium on Computer Animation, ACM, New York, NY, USA, SCA '09, 155-164.

Tasora, A., et al. 2008. "A GPU-based implementation of a cone convex complementarity approach for simulating rigid body dynamics with frictional contact." ASME Conference Proceedings 2008, 48722, 107-118. .

Poulsen, M, "A parallel Gauss Seidel method for computing contact forces", Masters thesis, University of Copenhagen, Jun. 2010/.

T. Preclik, K. Iglberger, and U. Rüle. Iterative Rigid Multibody Dynamics. In Proceedings of Multibody Dynamics 2009 (ECCOMAS Thematic Conference), 2009 .

Coumans, E. 2011. Game physics artefacts. Presented at the Game Developers Conference.

Lengyel, E. 2011. A jitter-tolerant rigid body sleep condition. In Game Engine Gems 2. A K Peters, ch. 23.

\* cited by examiner

PARALLEL LINEAR COMPLEMENTARITY SOLVER FOR RIGID BODY DYNAMICS

CROSS REFERENCE TO RELATED APPLICATIONS

This application is related to concurrently filed patent application Ser. No. 13/775,003, entitled "MODIFIED EFFECTIVE MASS FOR PARALLEL RIGID BODY SIMULATION," having a filing date of Feb. 22, 2013, which is herein incorporated by reference in its entirety.

BACKGROUND

Rigid body dynamics is widely used in applications ranging from movies to engineering to video games. Piles of objects are particularly common, because ultimately, gravity pulls all rigid bodies to the ground. Some of the most visually interesting simulations involve destruction, such as projectile impacts and explosions, and these can generate large piles of debris. In mechanical engineering some of the most computationally challenging problems involve simulating interaction with large resting systems of soil particles or rocks. Piles require stable simulation of static friction, dynamic friction and resting contact, which present many challenges.

In large-scale or real-time simulations, the time available for computation can be small compared to the number of rigid body contacts. In these cases iterative methods are used to solve rigid body dynamics. However, iteration is often terminated well before convergence to maximize the rigid body count. This results in residual energy, which can cause artifacts when its distribution over the contacts varies too much from frame to frame. The effect of this can be seen when bodies coming to rest oscillate (jitter) or move around each other non-physically (swim).

A commonly used iterative algorithm for simulating interactions is serial projected Gauss-Seidel (PGS), which solves contacts in sequence. When the iteration is terminated, the last contact solved has no error and the other contacts have non-zero error, resulting in an uneven distribution of the residual energy. On single threaded implementations the distribution of this error can be made consistent from frame to frame by, for example, by ensuring that collisions are detected in the same order each frame and that addition and deletion of bodies do not disrupt the order.

Unfortunately, things are not as straightforward for parallel implementations. PGS has limited parallelism, as updates to bodies having multiple contacts must be serialized to ensure they are not lost and the connectivity between bodies can be complex, especially in piles. It is very challenging to avoid jittering and swimming with parallel PGS, and due to serialization its performance does not scale well as more threads are added.

SUMMARY

A computer implemented method and system for a parallel iterative rigid body solver that simulates complex systems coming to rest while avoiding artifacts such as, jittering and swimming at very low iteration counts. The systems and methods deal with resolution of contacts after contacts have been detected. The parallel iterative solver and computer-implemented method for implementation distributes the residual among the contacts consistently from frame to frame eliminating swimming and visible jittering. This improves simulation quality in use cases where the iteration is stopped well before convergence without introducing swimming or visible jittering. It utilizes one thread per contact without requiring serialization, resulting in a low cost per iteration and providing excellent parallel scaling. In one embodiment, the method includes splitting the mass of each body between its contacts before solving the contacts independently. In another embodiment, the method splits the bodies so that each sub-body receives a block of contacts with the corresponding portion of the mass in order to accelerate convergence. The system solver and method provides for correct momentum propagation, static friction, dynamic friction and stable resting contact.

In one embodiment, a computer implemented method for solving linear complementarity problems for rigid body simulation is disclosed. The method includes providing, receiving and/or determining one or more contact constraints affecting an original object having an original mass. The method includes splitting the original object by a total number of the contact constraints into a plurality of sub-bodies. The method includes assigning a contact constraint to a corresponding sub-body. The method further includes solving contact constraints in isolation. The method also includes adding fixed joints between the sub-bodies, and enforcing them exactly, such that positions and/or velocities of each sub-body are identical.

In another embodiment, another method for solving linear complementarity problems for rigid body simulation or solving contact constraints for systems of rigid bodies is disclosed. The computer implemented method includes determining one or more patches associated with an original object having an original mass. The patch comprises a pair of colliding objects including the original object and the patch defines a plurality of contact constraints affecting the pair of colliding objects. The method includes splitting the original object by a total number of the patches into a plurality of sub-bodies. Each sub-body is assigned to a patch and comprises a sub-body mass defined by the original mass divided by the total number of the patches. The method also includes solving patches in parallel, such that for each patch, in sequential fashion contact constraints are solved approximately. The method also includes adding fixed joints between the sub-bodies, and enforcing them exactly, such that positions and/or velocities of each sub-body are identical.

In still another embodiment, a linear complementarity solver for rigid body simulation is disclosed. The solver includes a patch determining module for determining one or more patches associated with an original object having an original mass, wherein a patch comprises a pair of colliding objects including the original object and the patch defines a plurality of contact constraints affecting the pair of colliding objects. The solver includes an object splitter for splitting the original object by a total number of the patches into a plurality of sub-bodies. Each sub-body is assigned to a patch and comprises a sub-body mass defined by the original mass divided by the total number of patches. The solver also includes a contact constraint solver for solving patches in parallel, such that for each patch, in sequential fashion contact constraints are solved approximately. The solver also includes a fixed joint solver for enforcing fixed joint constraints exactly, such that positions and/or velocities of each sub-body are identical.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "splitting," "solving," "enforcing," "assigning," "determining," or the like, refer to actions and processes (e.g., flowcharts 400 and 800 of FIGS. 4 and 8, respectively) of a computer system or similar electronic computing device or processor (e.g., system 100, 200, 300, and 700 of FIGS. 1, 3 and 7 respectively). The computer system or similar electronic computing device manipulates and transforms data represented as physical (electronic) quantities within the computer system memories, registers or other such information storage, transmission or display devices.

Figure 4:
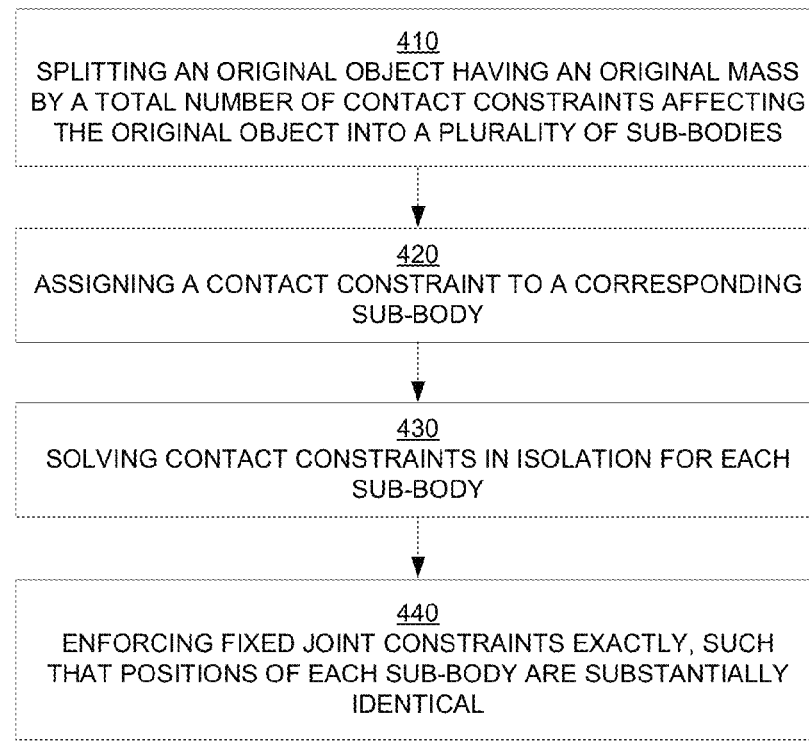
FIG. 4 is a flow diagram illustrating a scalar method for solving linear complementarity iterative rigid body dynamics, in accordance with one embodiment of the present disclosure.
Figure 8:
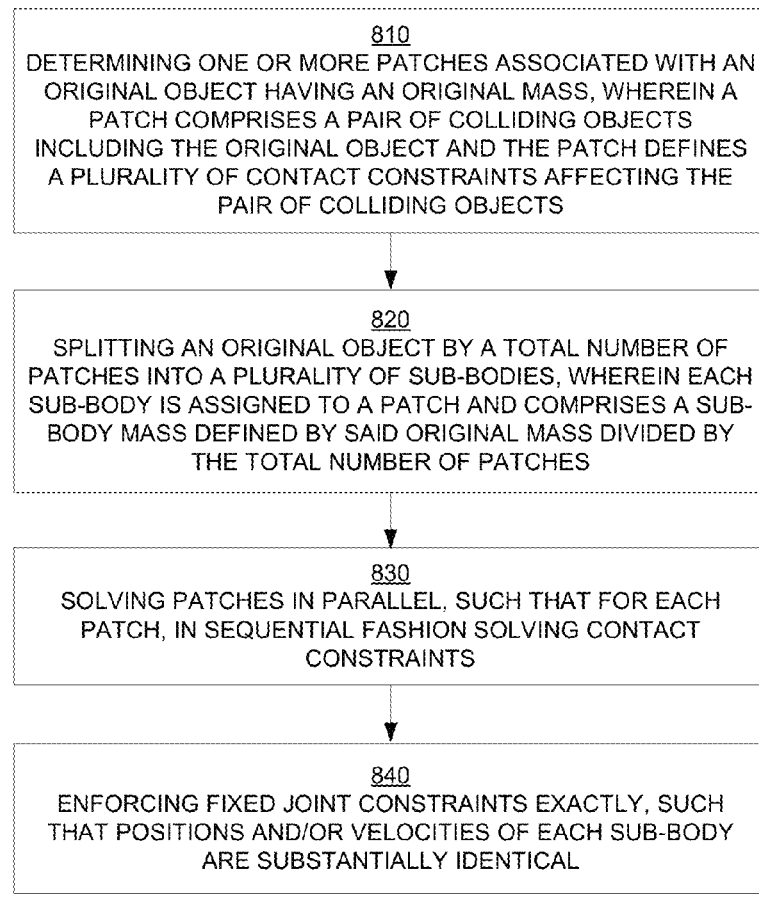
FIG. 8 is a flow diagram illustrating a block method for solving linear complementarity iterative rigid body dynamics, in accordance with one embodiment of the present disclosure.

FIGS. 4 and 8 are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
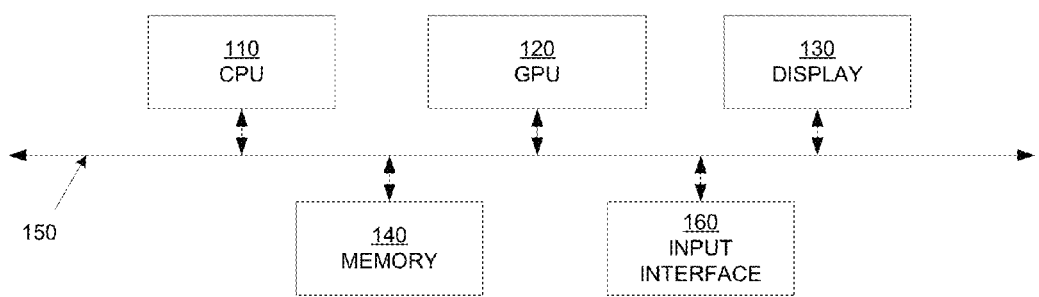
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 10 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
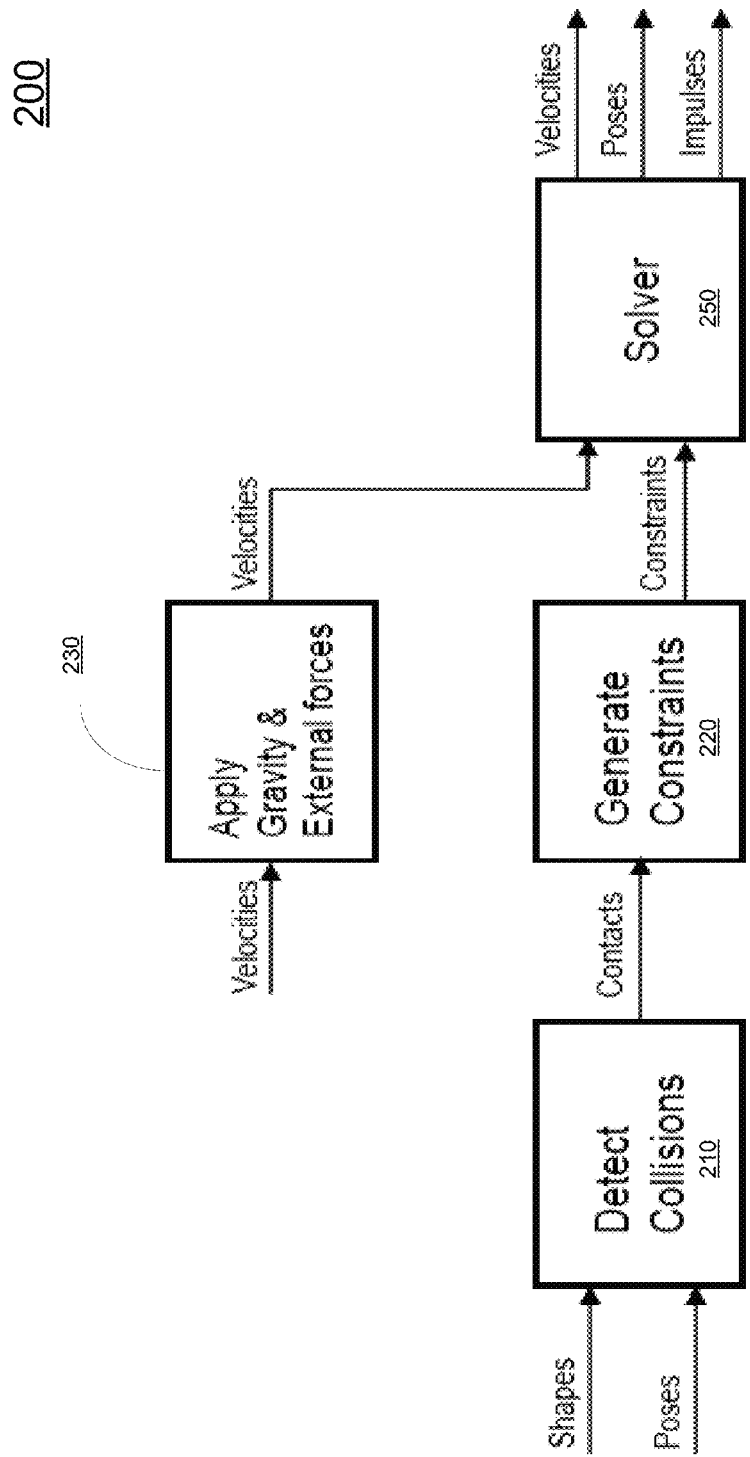
FIG. 2 is a block diagram of a exemplary system for performing rigid body simulation, in accordance with one embodiment of the present disclosure.

FIG. 2 is a block diagram of a rigid body physics system or engine 200 for performing rigid body simulation, in accordance with one embodiment of the present disclosure. In particular, system 200 calculates the motion of a set of bodies such that when the bodies are displayed on a screen, they appear to obey the laws of physics and don't pass through each other.

As shown in FIG. 2, at each displayed frame, a physics system 200 executes a sequence of stages (e.g., a pipeline) to calculate new the positions and orientations of the bodies. For instance, the pipeline of system 200 includes a collision detector 210 that takes as inputs shapes and poses of objects, and outputs contacts that describe the interactions of contacting pairs of objects. Each contact can be represented as a constraint that constrains the relative motion of pairs of contacting bodies. A constraint generator 220 takes each contact and converts it to a constraint representation that can be solved by a solver. That is, generator 220 outputs constraints. Block 230 takes the initial velocities of the objects and applies external forces or impulses affecting the objects. A vector of velocities is output from block 230. Solver 250 takes the set of constraints that the velocities, positions, and/or orientations of bodies must satisfy and calculates a set of corrections such that the bodies will satisfy the constraints once the corrections are applied to the bodies. In one embodiment, solver 250 calculates position corrections and velocity corrections. In another embodiment, solver 250 calculates only velocity corrections. In one embodiment, velocities are corrected with impulses. In another embodiment, velocities are corrected with forces.

In embodiments of the present invention, solver 250 solves a linear complementarity problem. The solver 250 is configured to process in parallel operations needed to simulate a very large number of rigid bodies at real-time frame rates (e.g., 60 Hz). As such, the desired frame rate is achieved using the parallel linear complementarity solver 250, which is running on a parallel processor or processors (e.g., GPU, multi-core CPU, multi-threaded processor, etc.).

Scalar Method and System for a Rigid Body Solver

Figure 3:
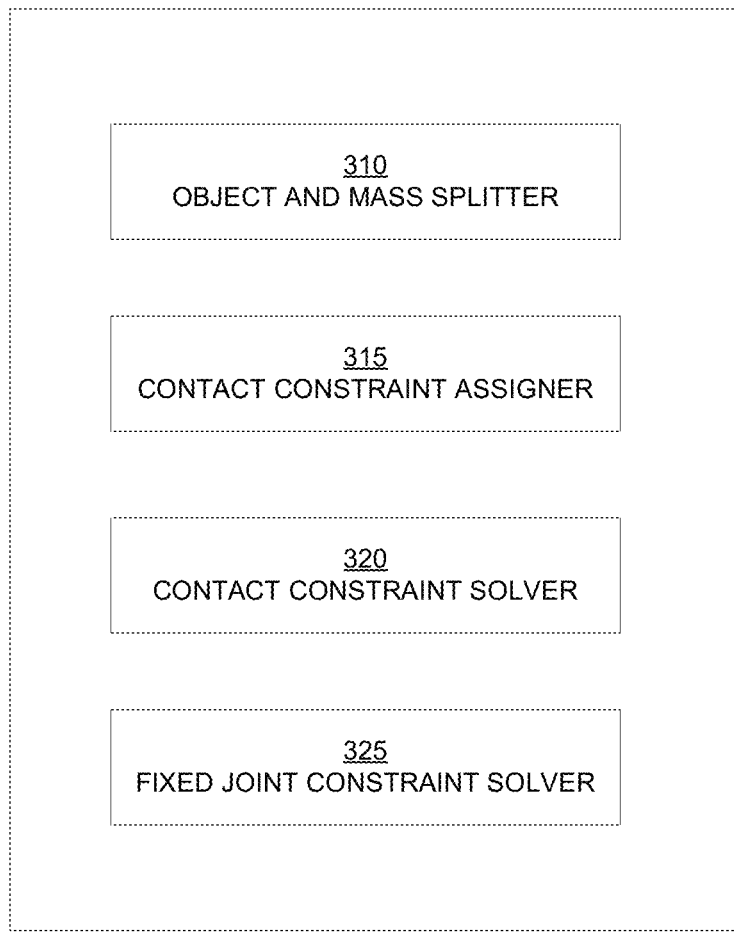
FIG. 3 is a block diagram of a linear complementarity, parallel iterative rigid body solver that implements a scalar method for simulating complex systems coming to rest while avoiding artifacts such as, jittering and swimming at very low iteration counts, in accordance with one embodiment of the present disclosure.

FIG. 3 is a block diagram of a linear complementarity, parallel iterative rigid body solver 300 for simulating complex systems coming to rest while avoiding artifacts such as, jittering and swimming at very low iteration counts, in accordance with one embodiment of the present disclosure. In one embodiment, solver 300 performs the functions of solver 250 of FIG. 2 within the rigid body physics system or engine 200.

Solver 300 includes an object mass splitter 310, for splitting an original object into a plurality of sub-bodies. The bodies are not split spatially, as performed by traditional finite element methods, but rather the mass is split so that all the sub-bodies have the same spatial extents, center of mass and initial velocity. In one embodiment, the splitter 310 also splits the original mass of the original object, such that each sub-body has the same mass distribution. More particularly, solver 300 is configured to split the original object by a total number of contact constraints that are affecting the original object.

Solver 300 also includes a contact constraint assigner 315. Each contact constraint is assigned to a corresponding sub-body. In that manner, by splitting the original object into one or more sub-bodies, multiple computing threads are used to compute solve contact constraint in parallel. That is, contact constraint solver 320 is configured to solve contact constraints approximately for each sub-body. Further, each contact constraint is solved with respect to its corresponding sub-body in isolation. As such, contact constraint assigner 315 is configured to use a relative velocity at the contact point as defined by the contact constraint and calculate an impulse applied at that point to eliminate the relative velocity.

Solver 300 also includes a fixed joint solver 325 that enforces fixed joint constraints exactly, such that positions and orientations of each sub-body are identical. With multiple sub-bodies, applying an impulse at one contact point for one constraint can affect the velocity at many other contact points. That is, after the sub-bodies have been computed, the impulse results are combined to find the force on the original body. The combination of sub-bodies is modeled as a fixed joint that forces all the sub-bodies of the original object to have the same position, orientation, and velocity. That is, in one embodiment, by splitting the original object into a plurality of sub-bodies, the fixed joint is enforced or solved at each iteration by averaging the sub-body velocities, positions and/or orientations and applying the average velocity to each of the sub-bodies. The average velocity is used as the initial velocity of the sub-bodies in the next iteration to solve contact constraints and fixed joint constraints FIG. 4 is a flow diagram 400 illustrating a computer implemented scalar method for solving linear complementarity iterative rigid body dynamics, in accordance with one embodiment of the present disclosure. In another embodiment, flow diagram 400 is implemented within a computer system including a processor and memory coupled to the processor and having stored therein instructions that, if executed by the computer system causes the system to execute a scalar method for solving linear complementarity iterative rigid body dynamics. In still another embodiment, instructions for performing a method are stored on a non-transitory computer-readable storage medium having computer-executable instructions for causing a computer system to perform a scalar method for solving linear complementarity iterative rigid body dynamics. In one embodiment, flow diagram 400 is implemented by solver 300 of FIG. 3, and/or solver 250 of FIG. 2. More particularly, flow diagram 400 is implemented to take a set of constraints that the velocities, positions, and/or orientations of objects must satisfy and calculate a set of forces and/or impulses such that the objects will satisfy the constraints once the forces and/or impulses are applied to the objects.

The method of flow diagram 400 is implemented after a set of constraints are defined, wherein contact constraints affect one or more objects or bodies. For instance, constraint generator 220 of FIG. 2 is able to determine the constraints that affect one or more objects or bodies. Once the constraints are defined, the scalar method of flow diagram 400 is implemented to determine the positions, orientations, and/or velocities of the one or more objects or bodies.

At 410, splitting of an original object is performed, wherein the original object is associated with an original mass. The original object is split into a plurality of sub-bodies by splitting the original object by a total number of contact constraints affecting the original object. Additionally, the sub-bodies all have the same spatial extent, center of mass, and initial velocity.

In one embodiment, each of the sub-bodies have the same mass distribution. That is, each of the sub-bodies have an equally divided mass that is defined by dividing the original mass by the total number of contact constraints. In another embodiment, the masses of each sub-body may be assigned to varying values, such that the masses of two sub-bodies may be different.

At 420, assigning each contact constraint to a corresponding sub-body is performed. By splitting into sub-bodies, different computing threads are used to compute different contact constraints in parallel. As such, parallel computations may be performed for solving contact constraints and solving fixed joint constraints, as provided in 430 and 440 below.

At 430, solving contact constraints is performed. In addition, the solving of contact constraints is performed in isolation for each sub-body. The affect one sub-body has on another sub-body is considered when solving for fixed joint constraints at 440.

In one embodiment, the velocity Signorini condition is satisfied when solving the contact constraints. That is, a contact constraint is solved between a pair of sub-bodies, such that impulses are applied in pairs to each sub-body, that have equal magnitudes but opposite directions in order to satisfy Newton's third law of motion. In that manner, the magnitude of the pair of impulses is solved. Applying the pair of impulses changes the relative velocity of the pair of sub-bodies at the contact point. The corresponding contact constraint imposes requirements on both the magnitude and the resulting relative velocity, as follows: the resulting relative velocity must be zero or positive (separating); and the magnitude of the impulse must be zero or positive (repulsive), wherein the velocity must be zero when the impulse is repulsive, and the impulse must be zero when the relative velocity is separating.

At 440, fixed joint constraints are solved exactly. More particularly, positions and/or velocities of each sub-body are solved such that they are substantially identical. For instance, in one embodiment, the enforcing of fixed joints is performed by averaging a plurality of sub-body velocities corresponding to the plurality of sub-bodies. As such, an average velocity is defined. Further, the average velocity is applied to each of the plurality of sub-bodies.

In one embodiment, the operations in 430 and 440 are iteratively performed. That is, for each iteration, given a starting average velocity from the previous iteration, a new average velocity and new position and/or new orientations are determined for a corresponding sub-body. These new values again correspond to an average velocity and position and/or orientation for the original object that can be used finally or for the next iteration.

In another embodiment, a frictional force is applied to determine the sub-body velocity at each iteration. Embodiments of the present disclosure support any means for applying friction. Embodiments of the present disclosure apply a coulomb friction model, though other friction models are supported. For instance, friction may be considered by applying a friction model, such that the more force an object is exerting on a surface, the harder it needs to be pushed to move it across the surface. As such, heavier objects are harder to push than lighter objects. In addition, the transition from sticking (e.g., when the object does not move) to sliding (e.g., when the object first moves) is considered.

The solution for the scalar method for performing linear complementarity in parallel for an iterative rigid body solver is described below. As previously described, the scalar method simulates complex systems coming to rest while avoiding artifacts such as, jittering and swimming at very low iteration counts. Portions described below are equally adaptable for use in the block method for performing linear complementarity in parallel for an iterative rigid body solver that is further described below in relation to FIGS. 7 and 8, in other embodiments.

Rigid Body Contact Dynamics

The rigid body contact model used is summarized. Consider a scene having n rigid bodies with positions $x \in \mathbb{R}^{6n}$, external forces $f_e \in \mathbb{R}^{6n}$ and masses $M \in \mathbb{R}^{6n \times 6n}$. Collision detection identifies m contacts between the rigid bodies, represented by constraints $\Phi(x) \geq 0$ with Jacobian $\partial\Phi/\partial x = J \in \mathbb{R}^{m \times 6n}$. For simplicity of description constraint stabilization is omitted, so the unknowns are the forces $\lambda \delta \mathbb{R}^m$ necessary to satisfy the time derivative of the constraints. Friction is treated separately, in one embodiment.

Contacts must satisfy the velocity Signorini condition: i.e., forces must not be attractive (e.g., $\lambda \geq 0$), velocities must move the system out of penetration $$\left(\frac{\partial \Phi}{\partial x} v \geq 0\right),$$

and a force should be applied at a contact only if that contact is not separating, which is expressed as $\lambda \geq 0 \perp Jv \geq 0$. Putting this all together, the continuous model is described in the following equations.

$$M\ddot{x} = J^T \lambda + f_e \quad (1)$$

$$\dot{x} = v \quad (2)$$

$$\lambda \geq 0 \perp Jv \geq 0 \quad (3)$$

Time Stepping

The model is discretized using a semi-implicit stepping scheme with time step h, and constraint impulse $z = h\lambda$, as described in the following equations:

$$M(v_{new} - v_{old}) = J^T z + h f_e \quad (4)$$

$$x_{new} - x = h v_{new} \quad (5)$$

$$z \geq 0 \perp J v_{new} \geq 0. \quad (6)$$

The Signorini condition causes the discretized model for rigid body dynamics to be a linear complementarity (LCP) formulation rather than a linear system. As such, let $x := LCP(A, b)$ be defined in the following equation:

find $x \in \mathbb{R}^m$ such that, for all $i = 1 \ldots m$.

$x_i \geq 0$ and $(Ax+b)_i \geq 0$ and $x_i = 0$ or $(Ax+b)_i = 0$. $\quad (7)$

As such, the discretized model is solved in the following equations:

$$v^0 = v_{old} + hM^{-1} f_e \quad (8)$$

$$q = Jv^0 \quad (9)$$

$$N = JM^{-1}J^T \quad (10)$$

$$z = LCP(N, q). \quad (11)$$

Two iterative methods can be used to solve the rigid body LCP: projected Gauss-Seidel (PGS) and projected Jacobi. Both these methods are described below.

Projected Guass-Seidel

The projected Guass-Seidel model solves each constraint individually in sequence. Let L, U, D be the lower triangle, upper triangle and diagonal of N respectively. Abstractly PGS generates the following iteration from an initial guess, $z^0$, in the following equations:

$$z^{r+1} = (z^r - D^{-1}(q + Lz^{r+1} + Uz^r))^+ \quad (12)$$

$$(x^+)_i \overset{\Delta}{=} \max(0, x_i). \quad (13)$$

Forming N explicitly would take $O(m^3)$ space and $O(m^2)$ time, which is often infeasible as m can be very large ($\geq 10000$). The formation of N may be avoided by explicitly updating the body velocities at each iteration, maintaining the invariant $v = M^{-1}J^T + v_{old}$, and calculating Jv when elements of Nz are required, which is shown in Algorithm 1, below:

---

Algorithm 1 PGS iteration optimized for $N = JM^{-1}J^T$

1: for all contacts, i do
2: $\quad z_i = \max(0, z_i - M_{ii}^{-1}(Jv)_i)$
3: $\quad v = M^{-1}J^T z$
4: end for

---

Each contact i constrains two bodies, let $b_{i1}$ be the index of the first body, and $b_{i2}$ be the index of the second. Each row of J corresponds to a contact and the (six element wide) column blocks of J correspond to the bodies constrained by each row, so J is sparse with two groups of six contiguous elements per row. By taking advantage of this sparsity, the iteration cost becomes $O(m)$ space and $O(m)$ time, which is described in Algorithm 2, below:

---

Algorithm 2 PGSiter(z, M, J, v)

1: for all contacts, i do
2: $\quad t = z_i$
3: $\quad z_i = \max(0, z_i - (M_{ii})^{-1}(Jv)_i)$
4: $\quad$ for all $j \in \{1, 2\}$ do
5: $\quad\quad \beta = b_{i,j}$
6: $\quad\quad v_\beta = v_\beta + M_\beta^{-1}(J_{i\beta})^T(z_i - t)$
7: $\quad$ end for
8: end for

---

Parallel Projected Gauss-Seidel

Each body is often in contact with more than one other body, so if all the contacts are processed in parallel, then each body velocity will be updated by many contacts simultaneously, which in turn causes velocity updates to be lost, thereby adversely affecting convergence. One solution is contact coloring, which partitions (or colors) the contacts so that each body is referenced at most once in each partition. The PGS solver can then process each color sequentially, processing the contacts within each color in parallel.

Figure 5:
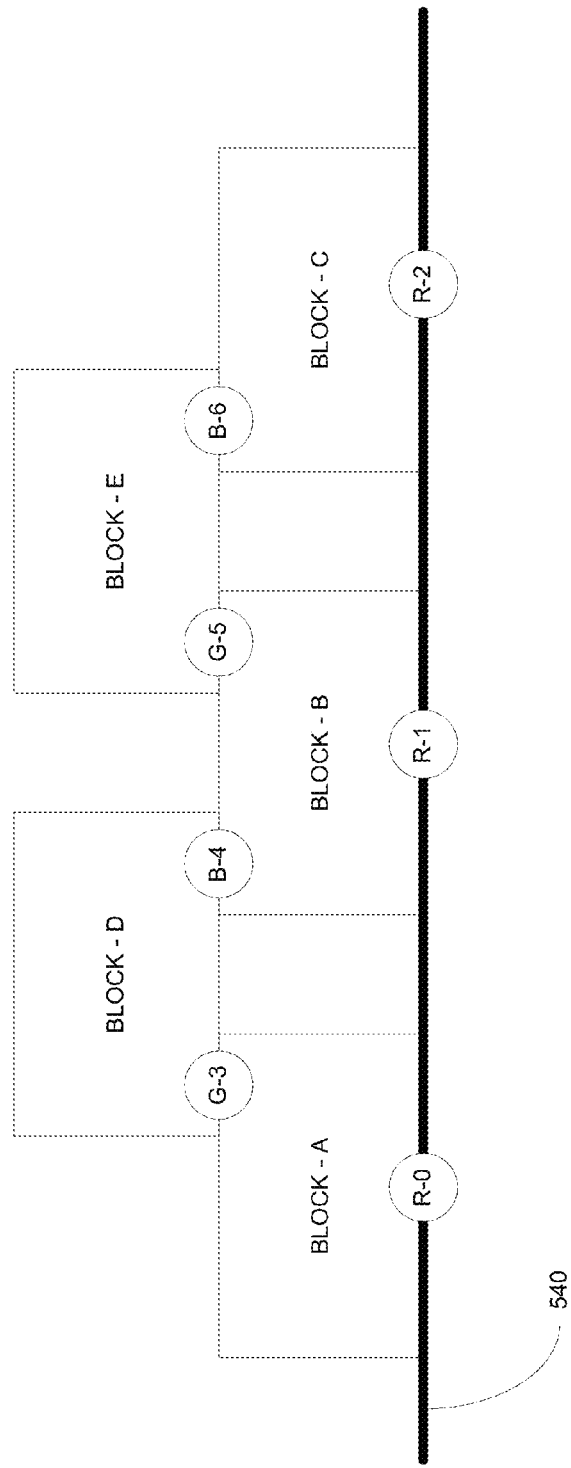
FIG. 5 is a diagram illustrating coloring for a parallel projected Gauss-Seidel solution for rigid body dynamics.

FIG. 5 is a diagram illustrating coloring for a parallel projected Gauss-Seidel solution for rigid body dynamics. As shown, five blocks are shown in various contact with each other and a surface 540. For instance, Block-A is in contact with surface 540 at R-0 and Block-D at G-3; Block-B is in contact with surface 540 at R-1, Block-D at B-4, and Block-E at G-5; Block-C is in contact with surface 540 at R-2, and Block-E at B-6; Block-D is in contact with Block-A at G-3, and Block-B at B-4; and Block-E is in contact with Block-B at G-5, and Block-C at B-6. Three colors are used to partition out the contacts so that each body is referenced at most in one partition, as follows: Red as "R," Green as "G," and Blue as "B." As such, the constraints are processed by partition, such as, processing R-0, R-1, and R-2 first, then processing G-3 and G-5, and then processing B-4 and B-6 last.

The number of colors required depends on $\Delta$, the maximum number of contacts per body over all the bodies. The minimum number of colors required is either $\Delta$ or $\Delta+1$. A parallel algorithm is used to find the optimal coloring, which gives at most 2Δ−1 colors. In piles containing objects of very different sizes, or long thin objects like planks of wood, Δ can be quite high. In the example with planks of wood, there may be up to 10 contacts per body and the greedy coloring algorithm may produce 16 colors. Generally, the first few colors contain a large proportion of the contacts, but the following colors contain fewer and fewer contacts. As the colors must be processed sequentially, the time taken by each iteration is multiplied by the number of colors, reducing the speedup of parallel PGS versus serial PGS. As such, on architectures (like graphic processing units [GPUs]) with hundreds of cores, most of them are idle for most of the iteration, especially as back end colors are processed. In embodiments of the present disclosure, processors are used to process contact constraints for one or more sub-bodies, and as such this unused processing power is harnessed to reduce swimming and jitter.

Parallel Projected Jacobi

In the parallel projected Jacobi method, each thread takes a constraint and calculates the impulse required to satisfy the constraint completely. Formally, the iteration is calculated in the following equation:

$$z^{r+1} = (z^r - D^{-1}(Nz^r + q))^+. \tag{14}$$

Mass Splitting

In embodiments of the present disclosure, each body is split into sub-bodies so that each sub-body has one contact. In one implementation, the mass is split evenly between the sub-bodies. In another implementation, the mass is split unevenly. As such, each sub-body is solved independently, and then joined back together after having processed all the contacts and their contact constraints.

A common way in non-rigid simulation is to split bodies spatially, as is done when simulating deformables using a finite element method. However, this would cost time and memory and would lead to a complicated method. On the other hand, in embodiments of the present disclosure, a body is split into sub-bodies that occupy the same region of space as the original body. Each sub-body has the same mass distribution as the original body, in one embodiment. Hence, each sub-body moment of inertia is just a scalar fraction of the original moment of inertia. The body is split so that each sub-body has just one contact. Fixed joints are added to force all the sub-bodies of each body to have the same position and/or velocity.

Splitting the Bodies

Figure 6:
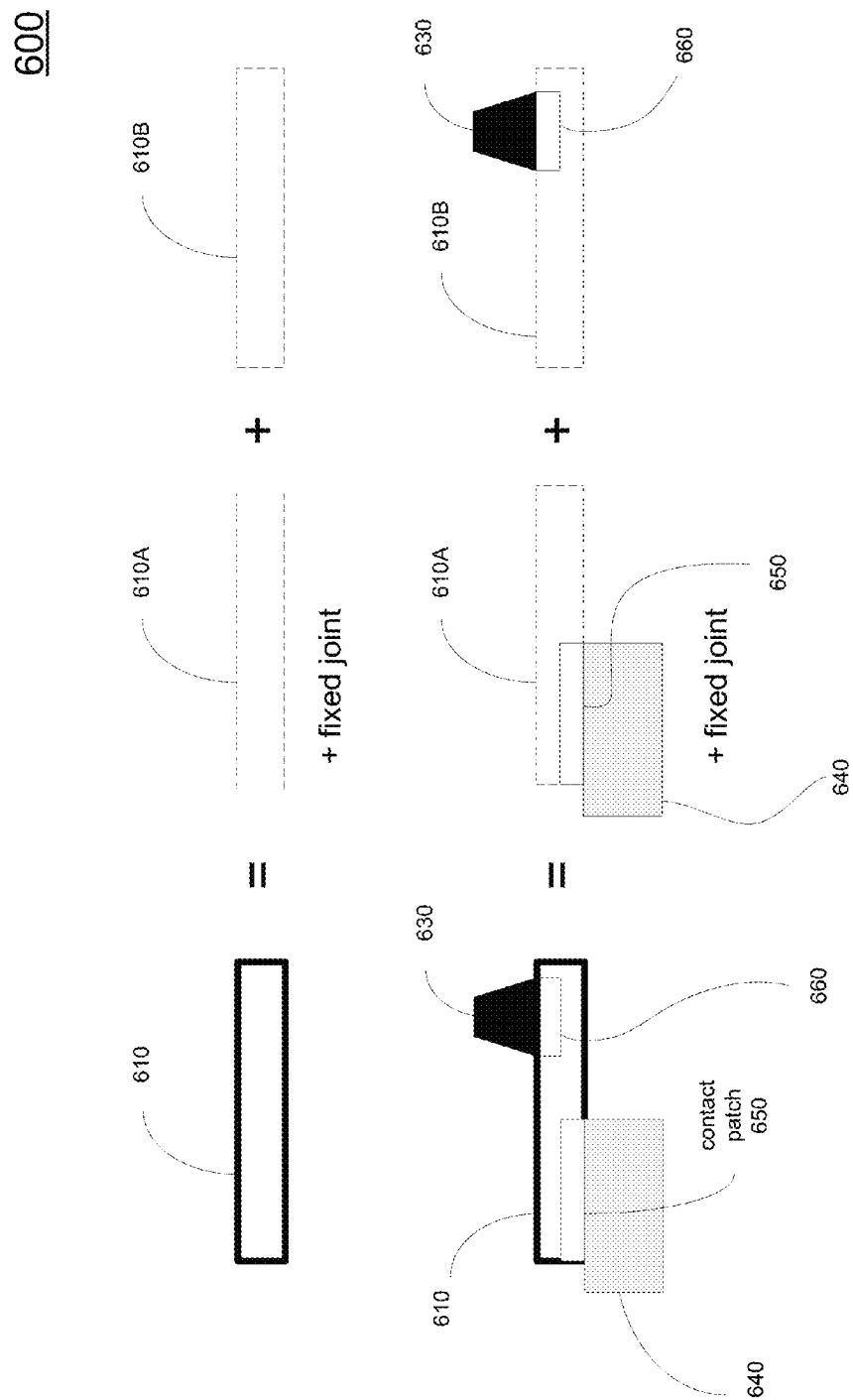
FIG. 6 is a diagram illustrating the splitting of the mass of an original object into one or more sub-bodies, in accordance with one embodiment of the present disclosure.

The split system is constructed from the original system. FIG. 6 is a diagram 600 illustrating the splitting of the mass of an original object into one or more sub-bodies, in accordance with one embodiment of the present disclosure. As such, original object 610 is split into sub-bodies 610A and 610B. A fixed joint constraint joins the sub-bodies back together. Also shown in FIG. 6 is the original object 610 in contact with a non-moving block 640 and a moveable object, such as, a concrete block 630. For instance, contact patch 650 represents the contact formed between original object 610 and non-moving block 640. Contact patch 660 represents the contact formed between original object 610 and moving block 630. Further, sub-bodies are formed and assigned to a contact or contact constraint. For instance, contact patch 650 represents the contact formed between sub-body 610A and non-moving block 640. Also, contact patch 660 represents the contact formed between sub-body 610B and moving block 660.

Continuing, let $n_\beta$ be the number of constraints affecting original body β. We split body β into $n_\beta$ sub-bodies, so the split system will have sub-bodies as described in Eqn. 15.

$$n_s = \sum_{\beta=1}^{n} n_\beta \tag{15}$$

The mass and inertia of body β is split evenly between its $n_\beta$ sub-bodies, in one embodiment. As such, the inverse mass matrix of the sub-bodies of body β is described in Equation 16, as follows:

$$W_\beta = \begin{bmatrix} n_\beta M_\beta^{-1} & & 0 \\ & \ddots & \\ 0 & & n_\beta M_\beta^{-1} \end{bmatrix} \in \mathbb{R}^{6n_\beta \times 6n_\beta}, \tag{16}$$

The inverse mass matrix of the whole split system is described in Equation 17, as follows:

$$W = \begin{bmatrix} W_1 & & 0 \\ & \ddots & \\ 0 & & W_n \end{bmatrix}. \tag{17}$$

Each sub-body is just a portion of the mass of the original body, so the initial velocity of each sub-body of body β is set to the initial velocity of the original body β, as described in Equation 18, as follows:

$$V_\beta = \begin{bmatrix} v_\beta \\ \vdots \\ v_\beta \end{bmatrix} \in \mathbb{R}^{6n_i}, \tag{18}$$

The velocity vector for the whole split system is described in Equation 19, as follows:

$$v^S = \begin{bmatrix} V_1 \\ \vdots \\ V_n \end{bmatrix}. \tag{19}$$

The unconstrained velocity, $v^{S0}$ is constructed from $v^S$ in the same way.

Joining the Bodies Back Together

A particular type of bilateral constraint is a fixed joint, a joint which forces the position and orientation of two bodies to be the same. Fixed joints are not commonly used, as it would be wasteful to calculate impulses to join two bodies when they could be replaced by a single body. However, during the derivation of the method, impulses will disappear in the final algorithm. Fixed joints are represented by the constraint function, as described in Equation 20, as follows:

$$\Phi^{FJ}\begin{pmatrix} x_1 \\ x_2 \end{pmatrix} = x_1 - x_2 = 0 \tag{20}$$

The Jacobian of the function is described in Equation 21, as follows:

$$J^{FJ} = \frac{\partial \Phi^{FJ}}{\partial x} = [I \ -I]. \quad (21)$$

For each body $\beta$, fixed joints $n_\beta-1$ are introduced to join the sub-bodies together. This gives a total number of fixed joints, $m_f$, as expressed in Equation 22, as follows:

$$m_f = \sum_{\beta=1}^{n} (n_\beta - 1). \quad (22)$$

The Jacobian of the fixed joints of body $\beta$ is described in Equation 23, as follows:

$$F_\beta = \begin{bmatrix} I_6 & -I_6 & 0 & \cdots & 0 \\ I_6 & 0 & -I_6 & & \vdots \\ \vdots & \vdots & & \ddots & 0 \\ I_6 & 0 & \cdots & 0 & -I_6 \end{bmatrix} \in \mathbb{R}^{6n_p \times 6(n_p-1)}, \quad (23)$$

Also, the Jacobian of all the fixed joints in the split system is described in Equation 24, as follows:

$$F = \begin{bmatrix} F_1 & & 0 \\ & \ddots & \\ 0 & & F_n \end{bmatrix}. \quad (24)$$

Assigning the Contacts to the Split Bodies

Contacts are assigned to sub-bodies on a one-to-one basis. That is, contacts in the set of $n_\beta$ contacts acting on body $\beta$ are assigned, such that each contact is assigned to a corresponding sub-body. The original Jacobian is partitioned into m×n blocks, such that $J_{\alpha\beta} \in \mathbb{R}^{I \times 6}$ represents the effect of contact $\alpha$ on body $\beta$, as described in Equation 25, as follows:

$$J = \begin{bmatrix} J_{11} & \cdots & J_{1n} \\ \vdots & & \vdots \\ J_{m1} & \cdots & J_{mn} \end{bmatrix}. \quad (25)$$

Each $J_\beta$ has $n_\beta$ nonzero rows corresponding to the contacts that affect body $\beta$. Let $r_j$ be the index of the jth nonzero row. In one implementation, the jth constraint of body $\beta$ is assigned to the jth sub-body of body $\beta$, as expressed in Equation 26, as follows:

$$[C_{\alpha\beta}]_{1,j} = \begin{cases} J_{\alpha\beta} & \text{if } \alpha = r_j \\ 0 & \text{otherwise.} \end{cases} \quad (26)$$

The expression, $[M_{\alpha\beta}]_{ij}$ is used to represent element i, j of block $\alpha, \beta$ of any block matrix M. Later, the inverse map of Equation 26 is needed. That is, given a split contact Jacobian, C, the corresponding unsplit contact Jacobian, J needs to be found. This is accomplished using a couple more definitions. For instance, let $s_{\alpha,1}$ be the rank of contact $\alpha$ in its first body's constraint list, and $s_{\alpha,2}$ be the rank in its second. As such, the inverse map is now expressed in Equation 27, as follows:

$$J_{\alpha\beta} = \begin{cases} [C_{\alpha\beta}]_{1,s_{\alpha,1}} & \text{if } b_{\alpha,1} = \beta \\ [C_{\alpha\beta}]_{1,s_{\alpha,2}} & \text{if } b_{\alpha,2} = \beta. \end{cases} \quad (27)$$

Putting all the bodies back together, the contact Jacobian for the whole split system is expressed in Equation 28, as follows:

$$C = \begin{bmatrix} C_{11} & \cdots & C_{1n} \\ \vdots & & \vdots \\ C_{m1} & \cdots & C_{mn} \end{bmatrix}. \quad (28)$$

The impulse required to enforce the contact constraints on the split bodies (i.e., ignoring the fixed joints) is now expressed in Equation 29, as follows:

$$\text{LCP}(CWC^T, q). \quad (29)$$

A Mixed LCP to Approximately Solve Contacts and Exactly Solve Fixed Joints

A system is presented that contains contact constraints and bilateral joint constraints, or fixed joint constraints. In particular, the system is represented with a mixed LCP (MLCP) formulation, as described in Equation 30, as follows:

$$\begin{bmatrix} z_C \\ z_F \end{bmatrix} = \text{MLCP}\left( \begin{bmatrix} N_{CC} & N_{CF} \\ N_{FC} & N_{CC} \end{bmatrix}, \begin{bmatrix} q_C \\ q_F \end{bmatrix} \right), \quad (30)$$

More particularly, the system containing the contact constraints and bilateral joint constraints is described in the following equations, as follows:

$$(N_{CC}z_C + N_{CF}z_F + q_C) \geq 0 \perp z_C \geq 0 \quad (31)$$

$$(N_{FC}z_C + N_{FF}z_F + q_F) = 0. \quad (32)$$

The impulse required to simultaneously satisfy the contacts on the split bodies and the joints that hold them together is expressed in Equation 33, as follows:

$$\begin{bmatrix} z_C \\ z_F \end{bmatrix} = \text{MLCP}\left( \begin{bmatrix} C \\ F \end{bmatrix} W \begin{bmatrix} C \\ F \end{bmatrix}^T, \begin{bmatrix} q \\ 0 \end{bmatrix} \right) \quad (33)$$

This is useful because $z_C$ is a solution of the original (i.e., unsplit) system. That is, Equation 34 shows the Theorem to be proved, as follows:

$$\begin{bmatrix} z_C \\ z_F \end{bmatrix} = \text{MLCP}\left( \begin{bmatrix} C \\ F \end{bmatrix} W \begin{bmatrix} C \\ F \end{bmatrix}^T, \begin{bmatrix} q \\ 0 \end{bmatrix} \right) \quad (34)$$

$$\Rightarrow$$

$$z_C = \text{LCP}(JM^{-1}J^T, q).$$

More particularly, suppose that $$\begin{bmatrix} z_C \\ z_F \end{bmatrix}$$

is a solution of the split system, resulting in Equation 35, as follows:

$$Cv^S + q \geq 0 \perp z_C \geq 0, \quad (35)$$

In Equation 35, the term $v^S$ is the velocity as expressed in Equation 36, as follows:

$$v^S = W(C^T z_C + F^T z_F). \quad (36)$$

Let $e(v^s)$ be the vector consisting of the velocity of the first sub-body for each body. It is shown that $z_C$ is a solution of the unsplit system. This is accomplished in two stages. First, it is shown that if impulse $z_C$ is applied to the unsplit system, then the velocity of the bodies is $e(v^s)$. Then, it is shown that the velocities $e(v^s)$ satisfy the constraints of the unsplit system. Then, applying impulse $z_C$ to the unsplit system will give the following velocity for each body $\beta$, in Equation 37, as follows:

$$(M^{-1} J^T z_C)_\beta = W_\beta n_\beta \sum_{k=1}^{n_b} (C_\beta^T z_C)_k \quad (37)$$
$$= W_\beta (I - F_\beta^T (F_\beta W_\beta F_\beta^T)^{-1} F_\beta W_\beta) C_\beta^T z_C$$
$$= [W(C^T z_C + F^T z_F)_\beta]_1.$$

This results in Equation 38, as follows:

$$M^{-1} J^T z_C = e(v^S). \quad (38)$$

Next, the velocities of the split system is shown to satisfy the constraints of the unsplit system in Equation 39, as follows:

$$(Cv^S)_\alpha = \sum_{\beta=1}^{n} C_{\alpha\beta} V_\beta \quad (39)$$
$$= \sum_{\beta=1}^{n} \sum_{j=1}^{n_\beta} [C_{\alpha\beta}]_{1,j} v_\beta$$
$$= (Je(v^S))_\alpha.$$

This results in the theorem in Equation 40, as follows:

$$Cv^S + q \geq 0 \perp z_C \geq 0 \Rightarrow JM^{-1} J^T z_C + q \geq 0 \perp z_C \geq 0. \quad (40)$$

Continuing, an MLCP can be solved by interleaving PGS iterations for the contact constraints, and with a direct (i.e., exact) solver for the fixed joints, as shown in Algorithm 3, as follows:

---

Algorithm 3 MLCP solver with iterative contacts and exact joints

1: $z_C = 0$
2: $z_F = 0$
3: for all iterations do
4:     for all contacts do
5:         $z_C = \max(0, z_C - D_{CC}^{-1}(q_C + N_{CC} z_C + N_{CF} z_F))$
6:     end for
7:     $z_F = \text{linsolve}(N_{FF}, q_F + N_{FC} z_C)$
8: end for

---

Proof of convergence for the iterative MLCP with exact joints for Algorithm 3 is described. In particular, an LCP iteration is applied, wherein $\lambda = 1$, and $\omega = 1$ in Equation 41, as follows:

$$E = \begin{bmatrix} D_{CC}^{-1} & 0 \\ 0 & N_{FF}^{-1} \end{bmatrix}, K = \begin{bmatrix} L_{CC} & 0 \\ N_{FC} & 0 \end{bmatrix}. \quad (41)$$

A new projection operator P is defined that applies (+) only to $z_C$. This gives the iteration, as described in Equations 42 and 43, as follows:

$$z_C^{r+1} = \left( z_C^r - D_{CC}^{-1} \left( q_C + L_{CC} z_C^{r+1} + [U_{CC} \ N_{CF}] \begin{bmatrix} z_C^r \\ z_F^r \end{bmatrix} \right) \right)^+, \quad (42)$$

$$z_F^{r+1} = z_F^r - N_{FF}^{-1} \left( q_F + [N_{FC} \ N_{FF}] \begin{bmatrix} z_C^{r+1} \\ z_F^r \end{bmatrix} \right). \quad (43)$$

This is the iteration that is evaluated by Algorithm 3. To prove convergence, for all $y \geq 0$, the following must be shown, as described in Equation 44, as follows:

$$(z^P - z)^T E^{-1} (z^P - y) \geq 0. \quad (44)$$

This is proved in Equation 45, as follows:

$$(z^P - z)^T E^{-1}(z^P - y) = \begin{bmatrix} z_C^+ - z_C \\ z_F - z_F \end{bmatrix}^T \begin{bmatrix} D_{CC} & 0 \\ 0 & N_{FF} \end{bmatrix} \begin{bmatrix} z_C^+ - y_C \\ z_F - y_F \end{bmatrix} \quad (45)$$
$$= (z_C^+ - z_C)^T D_{CC} (z_C^+ - y_C) \geq 0$$

Continuing, considering the specific MLCP arising from contact Jacobian C and joint Jacobian F, as described in Equation 46, as follows:

$$\begin{bmatrix} z_C \\ z_F \end{bmatrix} = MLCP\left( \begin{bmatrix} C \\ F \end{bmatrix} W \begin{bmatrix} C \\ F \end{bmatrix}^T, \begin{bmatrix} Cv^{S0} \\ 0 \end{bmatrix} \right). \quad (46)$$

As with PGS, the MLCP is optimized in one embodiment by introducing an auxiliary variable, as described in Equation 47, as follows:

$$v^S = W[C^T \ F^T] \begin{bmatrix} z_C \\ z_F \end{bmatrix} + v^{S0} \quad (47)$$

This results in Algorithm 4, as described below:

---

Algorithm 4 Velocity MLCP solver

1: for all iterations do
2:     $v^S = \text{PGSiter}(z_C, CWC^T, C, v^S)$
3:     $z_F = \text{linsolve}(FWF^T, Fv^S)$
4:     $v^S = v^S + WF^T z_F$
5: end for

---

Solving the Split System

The split system includes contact impulses that satisfy the original system, but the system can be reduced in embodiments of the present disclosure. The system is reduced in size through transformation. Algorithm 4 is applied to the split system, which results in Algorithm 5, provided below. This allows for early stoppage of the iterative process to give an approximately solution to the contact constraints, while exactly solving the fixed joint constraints.

The first part applies a single iteration of PGS to all the contacts. Each sub-body has exactly one constraint, so the contacts can be safely computed concurrently on m threads. Equations 48 and 49 update the velocity of body j of contact α, as follows:

$$i = d_{\alpha,j} \quad (48)$$

$$[v_\beta^S]_i = [v_\beta^S]_i + [W_\beta]_i [C_{\alpha,\beta}]_i^T (z_\alpha^C - t), \quad (49)$$

The fixed joints could be solved with a direct linear solver, but this would take too much memory and time. However, in embodiments of the present disclosure, the fixed joints can be solved using a lower-cost analytical solution, as expressed in Equation 50, as follows:

$$\forall i \in [1 \ldots n_\beta],$$
$$\left[\left(v^S - WF^T(FWF^T)^{-1}Fv^S\right)_\beta\right]_i = n_\beta^{-1} \sum_{k=1}^{n_\beta} [V_\beta]_k. \quad (50)$$

Equation 50 shows that the fixed joints can be enforced by averaging the sub-body velocities of each body at each iteration. This is proven in the following discussion, wherein for notational convenience, let S(n,m) be a matrix of size (6n, 6m) whose elements are all one, and let I(n,m) be the identify matrix of the same size, where it is defined that S(n)=S(n,n) and I(n)=I(n,n). This results in Equation 51, as follows:

$$F_\beta = [S(n_\beta-1,1) - I(n_\beta-1)]. \quad (51)$$

The following proof makes use of the identity, as described in Equation 52, as follows:

$$S(n,m)S(m,p) = mS(n,p). \quad (52)$$

What is proven is shown in Equation 53, as a Theorem, as follows:

$$(I(n_\beta) - F_\beta^T (F_\beta W_\beta F_\beta^T)^{-1} F_\beta W_\beta) = n_\beta^{-1} S(n_\beta). \quad (53)$$

Equation 54 starts the proof, as follows:

$$(F_\beta W_\beta F_\beta^T)^{-1} = n_\beta^{-1} M_\beta (I(n_\beta - 1) + S(n_\beta - 1))^{-1} \quad (54)$$
$$= n_\beta^{-1} M_\beta (I(n_\beta - 1) - n_\beta^{-1} S(n_\beta - 1)).$$

In addition, Equation 55 shows the following:

$$F_\beta^T (I(n_\beta - 1) - n_\beta^{-1} S(n_\beta - 1)) F_\beta = I(n_\beta) - n_\beta^{-1} S(n_\beta). \quad (55)$$

As such, Equation 56 results, wherein the velocities are averaged, as follows:

$$I(n_\beta) - F_\beta^T (F_\beta W_\beta F_\beta^T)^{-1} F_\beta W_\beta = \quad (56)$$
$$I(n_\beta) - n_\beta^{-1} M_\beta F_\beta^T (I(n_\beta - 1) - n_\beta^{-1} S(n_\beta - 1)) F_\beta W_\beta = n_\beta^{-1} S(n_\beta).$$

As a corollary, the fixed joints of body β is solved by setting the velocity of all its sub-bodies i∈[1 . . . n_β] as follows in Equation 57:

$$\left[\left(v^S - WF^T(FWF^T)^{-1}Fv^S\right)_\beta\right]_i = n_\beta^{-1} \sum_{k=1}^{n_\beta} [V_\beta]_k. \quad (57)$$

Continuing, fixed joints are enforced by averaging the sub-body velocities of each body at each iteration, as applied in Algorithm 5, as follows:

---

Algorithm 5 Parallel PGS contacts with averaging for joints

```
1:  p = diag(CWC^T)^-1
2:  for all iterations do
3:      {Apply one iteration of PGS to the sub-body contacts}
4:      for all contacts, α do {in parallel}
5:          t = z_Cα
6:          z_Cα = max(0, z_Cα - p_α (Cv^S)_α)
7:          for all j ∈ {1,2} do
8:              β = b_α,j
9:              i = s_α,j
10:             [v_β^S]_i = [v_β^S]_i + [W_β]_i [C_α,β]_i^T (z_α^C - t)
11:         end for
12:     end for
13:     {Solve the fixed joints by velocity averaging}
14:     for all bodies, β do
15:         a = n_β^-1 Σ_{k=1}^{n_β} [V_β]_k
16:         for all sub-bodies, i do {all sub-bodies get the same vel.}
17:             [v_β^S]_i = a
18:         end for
19:     end for
20: end for
```

---

Also, the sub-body velocities of each body are equal at the end of each iteration, so in one embodiment, the sub-body velocity need not be explicitly stored for every sub-body. In fact, in one embodiment, the masses of the sub-bodies are scaled or calculated dynamically, as the corresponding body mass is scaled before the sub-body mass is used. Using these optimizations and making use of the definitions of C, $V^S$ and W, Algorithm 6 is provided below. In one embodiment, the algorithm is parallelizable, wherein lines 24 to 32 can be implemented using a parallel segmented reduction.

---

Algorithm 6 Final mass splitting solver, scalar version

```
1:  {Assemble mass splitting preconditioner}
2:  for all contacts, α do
3:      p_α = 0
4:      for all j ∈ {1,2} do
5:          β = b_α,j
6:          {divide mass by number of number of bodies it touches}
7:          m_split = M_β / n_β

8:          p_α = p_α + J_αβ * m_split^-1 * J_βα^T
9:      end for
10:     p_α = p_α^-1
11: end for
12: {Solver}
13: for all iterations do
14:     {Solve each sub-body contact}
15:     for all contacts, α do {in parallel}
16:         t = z_Cα
17:         z_Cα = max(0, z_Cα - p_α (Jv)_α)
18:         for all j ∈ {1,2} do
19:             β = b_α,j
20:             D_αj = v_β + n_β M_β^-1 {J_αβ}^T (z_α^C - t)
21:         end for
22:     end for
23:     {Fixed joints, implement with parallel segmented reduction}
24:     for all bodies, β do
25:         a = 0
```

-continued

| Algorithm 6 Final mass splitting solver, scalar version |
| --- |
| 26:       for all j ∈ {1,2} do |
| 27:          for all i such that $b_{ij}$ = β do |
| 28:            a = a + $D_{ij}$ |
| 29:          end for |
| 30:       end for |
| 31:       $v_\beta = n_\beta^{-1}a$ |
| 32:   end for |
| 33: end for |

Block Method and System for a Rigid Body Solver

The scalar rigid body solver described in FIGS. 3 and 4 so far meets the jitter and load balancing requirements. To make the solution provided by the solver descried in FIGS. 3 and 4 converge more quickly, constraints are solved in blocks, in one embodiment as is described in FIGS. 7 and 8. In the scalar method described previously in relation to FIGS. 3-6, the bodies are split so that each sub-body had exactly one constraint. In the present embodiment, the collision detection system takes pairs of potentially colliding bodies and finds their intersections. For convex pairs, the intersection set has one connected component, for non-convex pairs the intersection can have many components. Each component of each intersection is referred to as a patch. In the block solver of the present embodiment, the bodies are split so that so that there is one sub-body per patch. As such, each sub-body now has multiple contacts, so contacts cannot be processed in parallel. Instead, each patch is processed in parallel, and the contents are solved within each path sequentially on its thread using PGS.

Figure 7:
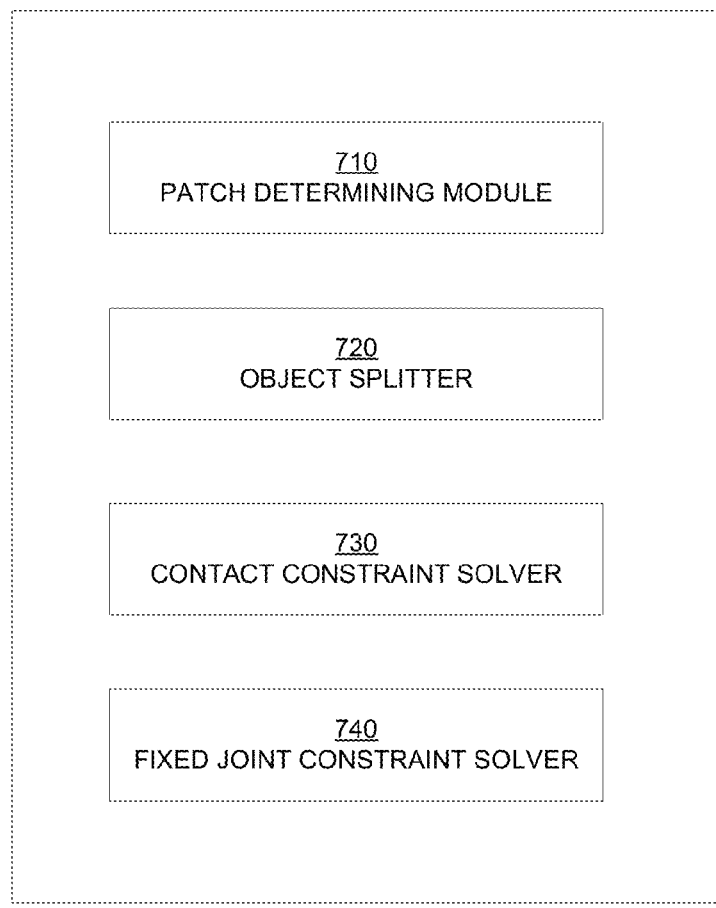
FIG. 7 is a block diagram of a linear complementarity, parallel iterative rigid body solver that implements a block method for simulating complex systems coming to rest while avoiding artifacts such as, jittering and swimming at very low iteration counts, in accordance with one embodiment of the present disclosure.

FIG. 7 is a block diagram of a linear complementarity, parallel iterative rigid body solver 700 that implements a block method for simulating complex systems coming to rest while avoiding artifacts such as, jittering and swimming at very low iteration counts, in accordance with one embodiment of the present disclosure. In one embodiment, solver 700 performs the functions of solver 250 of FIG. 2 within the rigid body physics system or engine 200.

Solver 700 includes a patch determining module 710. For a particular original object, a pair of potentially colliding bodies defines an intersection set of contacts. That is, a patch defines a plurality of contact constraints affecting the pair of colliding objects. One of the pair of colliding objects includes the original object, which is associated with an original mass. In one embodiment, the intersection set has one connected component (e.g., for convex pairs). In another embodiment, the intersection set has multiple components (e.g., for non-convex pairs).

Solver 700 includes an object and mass splitter 720, for splitting an original object into a plurality of sub-bodies. An original object is split so that there is one sub-body per patch. As such, each sub-body has multiple contacts. Instead of processing the contacts in parallel, patches are processed in parallel. As such, object splitter 720 is configured to split the original object by a total number of patches. Also, each sub-body has a mass, which is defined by the original mass divided by the total number of patches.

Contact constraint solver 730 is configured to solve contact constraints approximately for each sub-body. Further, each sub-body has multiple contacts and/or multiple contact constraints. In one embodiment, each contact constraint within a patch is solved approximately and sequentially. By solving for the contact constraints within a patch, a sub-body position and/or velocity is determined.

Solver 700 also includes a fixed joint solver 740 that enforces fixed joint constraints exactly, such that positions of each sub-body are identical. The fixed joint solver 740 is necessary because applying an impulse at a contact of the original body results in velocities at other contacts of the same body. The goal is for each of the sub-bodies to behave exactly like the original body, such that when an impulse is applied at one sub-body, it is necessary to change the velocities of other sub-bodies of the same body. The requirement that all the sub-bodies move together is modeled as a fixed joint, and is enforced by the fixed joint solver 740. In one embodiment, the fixed joint is enforced or solved at each iteration by averaging the sub-body velocities and applying the average velocity to each of the sub-bodies. The average velocity is used as the initial velocity of the sub-bodies in the next iteration to solve contact constraints and fixed joint constraints FIG. 8 is a flow diagram 800 illustrating a computer implemented block method for solving linear complementarity iterative rigid body dynamics, in accordance with one embodiment of the present disclosure. In another embodiment, flow diagram 400 is implemented within a computer system including a processor and memory coupled to the processor and having stored therein instructions that, if executed by the computer system causes the system to execute a block method for solving linear complementarity iterative rigid body dynamics. In still another embodiment, instructions for performing a method are stored on a non-transitory computer-readable storage medium having computer-executable instructions for causing a computer system to perform a block method for solving linear complementarity iterative rigid body dynamics. In one embodiment, flow diagram 800 is implemented by solver 700 of FIG. 7, and/or solver 250 of FIG. 2. More particularly, flow diagram 800 is implemented to take a set of constraints that the positions and/or velocities of objects must satisfy and calculate a set of forces and/or impulses such that the objects will satisfy the constraints once the forces and/or impulses are applied to the objects.

The method of flow diagram 800 is implemented after a set of constraints are defined, wherein contact constraints affect one or more objects or bodies. For instance, constraint generator 220 of FIG. 2 is able to determine the constraints that affect one or more objects or bodies. Once the constraints are defined, the block method of flow diagram 800 is implemented to determine the positions and/or velocities of the one or more objects or bodies.

At 810, determining one or more patches associated with an original object is performed. The original object has an original mass. Also, each patch comprises a pair of colliding objects, one of which includes the original object. Further, each patch defines a plurality of contact constraints that affect the pair of colliding objects. As such, each patch is associated with multiple contacts.

At 820, splitting the original object is performed. In particular, the original object is split into a plurality of sub-bodies, such that there is one sub-body per patch. As such, the number of patches defines the number of sub-bodies. In addition, the mass for each sub-body is defined by dividing the original mass for the original object by the total number of patches.

At 830, solving patches for their corresponding contact constraints is performed. In particular, for each patch, contact constraints are solved sequentially. That is, for each contact constraint of a patch, an impulse is calculated to satisfy the contact constraint. This is accomplished by solving for a sub-body velocity vector of the sub-body due to the contact constraint. In one embodiment, the relative velocity vector is constrained to be resting or separating (non-negative). Also, the impulses are constrained to be non-attractive (non-negative). In addition, impulse should be zero at separating contacts. This is performed until a final velocity and position is determined for the sub-body associated with the patch.

At 840, enforcing fixed joints exactly is performed, such that fixed joint constraints are solved exactly. More particularly, positions and/or velocities of each sub-body are solved such that they are substantially identical. For instance, in one embodiment, the enforcing of fixed joints is performed by averaging a plurality of sub-body velocity vectors corresponding to the plurality of sub-bodies. As such, an average velocity vector is defined. Further, the average velocity vector is assigned to each of the plurality of sub-bodies.

In one embodiment, the operations in 830 and 840 are iteratively performed. That is, for each iteration, given a starting average velocity vector from the previous iteration, a new average velocity vector and new position are determined for a corresponding sub-body. These new values again correspond to an average velocity vector and/or position for the original object that can be used finally or for the next iteration.

In another embodiment, a frictional force is applied to the sub-bodies at each iteration. Embodiments of the present disclosure support any means for applying friction to the block method for solving linear complementarity iterative rigid body dynamics. Embodiments of the present disclosure apply a coulomb friction model, though other friction models are supported. For instance, friction may be considered by applying a friction model, such that the more force an object is exerting on a surface, the harder it needs to be pushed to move it across the surface. As such, heavier objects are harder to push than lighter objects. In addition, the transition from sticking (e.g., when the object does not move) to sliding (e.g., when the object first moves) is considered.

The solution for the block method for performing linear complementarity in parallel for an iterative rigid body solver is described below. As previously described, the block method simulates complex systems coming to rest while avoiding artifacts such as, jittering and swimming at very low iteration counts. The block method converges more quickly than the scalar method previously described in relation to FIGS. 3-6.

For definition, let $b_{i,1}^P$ and $b_{i,2}^P$ be the two bodies constrained by patch i. Also, let $n_\beta^P$ be the number of patches affecting body $\beta$ in the unsplit system, as described in Equation 58, as follows:

$$n_\beta^P = |\{i : b_{i,1}^P = \beta \lor b_{i,2}^P = \beta\}|. \tag{58}$$

Splitting the Bodies in the Block Method

The bodies are split into sub-bodies so that each sub-body has one patch. The total number of sub-bodies is described in Equation 59, as follows:

$$n_B \sum_{\beta=1}^{n} n_\beta^P. \tag{59}$$

Again, the mass of each sub-body is split evenly between its sub-bodies, in one embodiment, as described in Equation 60, as follows:

$$W_\beta^P = \begin{bmatrix} n_\beta^P M_\beta^{-1} & & 0 \\ & \ddots & \\ 0 & & n_\beta^P M_\beta^{-1} \end{bmatrix} \in \mathbb{R}^{6n_\beta^P \times 6n_\beta^P}. \tag{60}$$

Joining the Bodies Back Together

The sub-bodies of each body are joined together with $n_\beta^P - 1$ fixed joints. The Jacobian of the fixed joints of body $\beta$ is described in Equation 61, as follows:

$$F_\beta^P = \begin{bmatrix} I_6 & -I_6 & 0 & \cdots & 0 \\ I_6 & 0 & -I_6 & & \vdots \\ \vdots & \vdots & & \ddots & 0 \\ I_6 & 0 & \cdots & 0 & -I_6 \end{bmatrix} \in \mathbb{R}^{6n_\beta^P \times 6(n_\beta^P - 1)}. \tag{61}$$

Assigning the Contacts to the Split Bodies

Let the total number of patches be p and the number of contacts in patch i be $m_i$. The rows of J are partitioned into blocks as well as the columns, so that $J_{i\beta}^P \in \mathbb{R}^{m_i \times 6}$ represents the effect of patch i on body $\beta$ as shown in Equation 62, as provided below:

$$J = \begin{bmatrix} J_{11}^P & \cdots & J_{1n}^P \\ \vdots & & \vdots \\ H_{p1}^P & \cdots & J_{pn}^P \end{bmatrix}. \tag{62}$$

In addition, each patch of a number of patches $n_\beta^P$ that is acting on body $\beta$ is assigned to its own sub-body, as described in Equation 63, as follows:

$$[C_{\alpha\beta}^P]_{ij} = \begin{cases} [J_{\alpha\beta}^P]_{ij} & \text{if } r_j = \alpha \\ 0 & \text{otherwise.} \end{cases} \tag{63}$$

Solving the Block Split System

A block-sparse MLCP is defined in Equation 64, as follows:

$$\begin{bmatrix} z_C^P \\ z_F^P \end{bmatrix} = MLCP\left(\begin{bmatrix} N_{CC}^P & N_{CF}^P \\ N_{FC}^P & N_{FF}^P \end{bmatrix}, \begin{bmatrix} q \\ 0 \end{bmatrix}\right) \tag{64}$$

$$\begin{bmatrix} N_{CC}^P & N_{CF}^P \\ N_{FC}^P & N_{FF}^P \end{bmatrix} = \begin{bmatrix} C^P \\ F^P \end{bmatrix} W^P \begin{bmatrix} C^P \\ F^P \end{bmatrix}^T.$$

In Equation 64, the term $N_{CC}^P$ is a block diagonal with blocks defined in Equation 65, as follows:

$$B_{\alpha\alpha} = \sum_{k=1}^{n} C_{\alpha k}^P W_k (C_{\alpha k}^P)^T \tag{65}$$

$$= \sum_{k=1}^{n} n_k^P J_{\alpha k}^P M_k^{-1} (J_{\alpha k}^P)^T$$

$$= n_{b_{\alpha,1}} J_{\alpha,b_{\alpha,1}}^P M_{b_{\alpha,1}}^{-1} (J_{\alpha,b_{\alpha,1}}^P)^T + n_{b_{\alpha,2}} J_{\alpha,b_{\alpha,2}}^P M_{b_{\alpha,2}}^{-1} (J_{\alpha,b_{\alpha,2}}^P)^T.$$

Let $L_{\alpha\alpha}$ and $D_{\alpha\alpha}$ be the lower triangle and diagonal of $B_{\alpha\alpha}$. Applying the LCP iteration, with $\lambda=1$ and $\omega=1$ results in Equations 66-68, as follows:

$$E = \begin{bmatrix} D_{11} & 0 & 0 \\ & \ddots & & \vdots \\ 0 & & D_{pp} & 0 \\ 0 & \ldots & 0 & N_{FF}^P \end{bmatrix} \quad (66)$$

and $$K = \begin{bmatrix} L_{11} & & 0 & 0 \\ & \ddots & & \vdots \\ 0 & & L_{pp} & 0 \\ (N_{FC}^P)_1 & \ldots & (N_{FC}^P)_p & 0 \end{bmatrix} \quad (67)$$

And $$\begin{aligned} z_{C1}^{r+1} &\phantom{=} (z_1^r - D_{11}^{-1}(q_1 + L_{11}z_1^{r+1} + U_{11}z_1^r + (N_{CF}^P)_1 z_F)) + \\ &\vdots \\ z_{Cp}^{r+1} &= (z_p^r - D_{pp}^{-1}(q_p + L_{pp}z_p^{r+1} + U_{pp}z_p^r + (N_{CF}^P)_p z_F)) + - \\ z_F^{r+1} &\phantom{=} (N_{FF}^P)^{-1} \sum_{a=1}^{P}(N_{FC}^P)_a (z_C)_a^{r+1} \end{aligned} \quad (68)$$

Algorithm 7 provides an implementation of this iteration. In one embodiment, the blocks of $z_C$ are computed in parallel.

---

Algorithm 7 Block MLCP solver with iterative contacts and exact joints

---
1: $z_C=0$
2: $z_F=0$
3: for all iterations do
4:     for all blocks, $\alpha$ do {in parallel}
5:         for all contacts in block, i do
6:             $t = [z_{C\alpha}]_i - [D_{\alpha\alpha}]_{ii}^{-1}([q_\alpha]_i + [B_{\alpha\alpha}z_{C\alpha}]_i + [(N_{CF}^P z_F)_\alpha]_i)$
7:             $[z_{C\alpha}]_i = \max(0,t)$
8:         end for
9:     end for
10:     $z_F$ = linsolve($N_{FF}$, $q_F + N_{FC}z_C$)
11: end for

---

Lines 4-7 of Algorithm 7 are equivalent to running PGS on each block independently. As an improvement, Algorithm 8 is a velocity version of Algorithm 7, as described below:

---

Algorithm 8 Velocity MLCP block solver

---
1: for all iterations do
2:     for all blocks, $\alpha$ do {in parallel}
3:         $v^S$ = PGSiter($z_\alpha, D_{\alpha\alpha}, [C_{\alpha 1} \ldots C_{\alpha n}], v^S$)
4:     end for
5:     $z_F$ = linsolve($N_{FF}, N_{FC}z_C$)
6:     $v^S = v^S + WF^T z_F$
7: end for

---

The fixed joints are solved by velocity averaging, as previously described in relation to the scalar method for solving rigid body dynamics. Algorithm 9 provides the velocity averaging for the fixed joints below.

---

Algorithm 9 Block solver with velocity averaging for joints

---
1: for all iterations do
2:     for all patches, $\alpha$ do {in parallel}
3:         for all contacts in patch, i do (sequentially on thread $\alpha$)
4:             $t = [z_{C\alpha}]_i$
5:             $[z_{C\alpha}]_i = \max(0, [z_{C\alpha}]_i - [D_{\alpha\alpha}]_{ii}^{-1}[C_{\alpha 1} \ldots C_{\alpha n}]v_i^S)$
6:             for all $i \in \{1,2\}$ do
7:                 $\beta = b_{i,j}$
8:                 $k = s_{\alpha,j}$
9:                 $[v_\beta^S]_k = [v_\beta^S]_k + [W_\beta]_k[C_{\alpha,\beta}]_k^T (z_{C\alpha} - t)$
10:             end for
11:         end for
12:     end for
13:     {Solve the fixed joints by velocity averaging}
14:     for all bodies, $\beta$ do
15:         $a = n_\beta^{-1} \sum_{k=1}^{n\beta}[V_\beta]_k$
16:         for all sub-bodies, i do {all sub-bodies get the same vel.}
17:             $[v_\beta^S]_i = a$
18:         end for
19:     end for
20: end for

---

For the definitions of $C^P$ and $W^P$, Equation 69 is provided below:

$$\text{diag}(B_{\alpha\alpha}) = \text{diag}([J_{\alpha 1}^P \ldots J_{\alpha n}^P]M^{-1}[J_{\alpha 1}^P \ldots J_{\alpha n}^P]^T). \quad (69)$$

Finally, the sub-body velocities are eliminated in the same way as previously described in the scalar method for solving rigid body dynamics, as described in Algorithm 10, as follows:

---

Algorithm 10 Final mass splitting solver, block version

---
1:     {Assemble mass splitting preconditioner}
2:     for all patches, $\alpha$ do
3:         for all contacts in patch, i do
4:             $\{p_\alpha\}_i = 0$
5:             for all $j \in \{1,2\}$ do
6:                 $\beta = b_{\alpha,j}^P$
7:                 {divide body's mass by its patch count}
8:                 $m_{split} = \dfrac{M_\beta}{n_\beta^P}$
9:                 $[p_\alpha]_i = [p_\alpha]_i + [J_{\alpha\beta}]_i * m_{split}^{-1} * [J_{\beta\alpha}]_i^T$
10:             end for
11:         $p_\alpha = p_\alpha^{-1}$
12:         end for
13:     end for
14:     {Solver}
15:     for all iterations do
16:         for all patches, $\alpha$ do {in parallel}
17:             $\beta_1, \beta_2 = b_{\alpha 1}^P, b_{\alpha 2}^P$
18:             $D_{\alpha 1}, D_{\alpha 2} = v_{\beta_1}, v_{\beta_2}$
19:             for all contacts in patch, i do {sequentially on thread $\alpha$}
20:                 $t = [z_{C\alpha}]_i$
21:                 $[z_{C\alpha}]_i = \max(0, [z_{C\alpha}]_i - [p_\alpha]_i(J_{\alpha,\beta_1}D_{\alpha 1} + J_{\alpha,\beta_2}D_{\alpha 2}))$
22:                 for all $j \in \{1, 2\}$ do
23:                     $k = s_{\alpha,j}$
24:                     $D_{\alpha j} = D_{\alpha j} + M_{\beta_j}^{-1}J_{\alpha,\beta_j}^T(z_{C\alpha} - t)$
25:                 end for
26:             end for
27:         end for
28:         {Fixed joints, implement with parallel segmented reduction}
29:         $a = 0$
30:         for all $j \in \{1,2\}$ do
31:             for all $\alpha$ such that $b_{\alpha j} = \beta$ do
32:                 $a = a + D_{\alpha j}$
33:             end for
34:         end for
35:         $v_\beta = n_\beta^{-1}a$
36:     end for Thus, according to embodiments of the present disclosure, systems and methods are described that provide for a parallel iterative rigid body solver and method for implementing the same that simulate complex systems coming to rest while avoiding artifacts such as, jittering and swimming at very low iteration counts. The linear complementarity solvers and methods for implementing the same for formulating rigid body dynamics provide for correct momentum propagation, static friction, dynamic friction, and stable resting contact.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer system comprising:
a processor; and
memory coupled to said processor and having stored therein instructions that are executed by said computer system to cause said computer system to execute a parallel iterative rigid body solver for solving linear complementarity problems for rigid body simulation, comprising:
an object mass splitter that splits an original object having an original mass by a total number of one or more contact constraints affecting said original object into a plurality of sub-bodies, such that said sub-bodies of said original object comprise identical spatial extents, center of masses, and initial velocities, and wherein said original mass is split by a total number of contacts affecting said original object;
a fixed joint solver that models said plurality of sub-bodies as a fixed joint;
a contact constraint assigner that assigns a contact constraint to a corresponding sub-body; and
a contact constraint solver that solves contact constraints in isolation for each sub-body, wherein fixed joint constraints are enforced in the system by assigning an average velocity to each of said plurality of sub-bodies, to make the positions and/or velocities of each sub-body substantially identical,
wherein said contact constraint solver solves contacts constraints in parallel using a plurality of computing threads executed by said processor.

2. The computer system of claim 1, wherein said contact constraint solver is configured to solve contact constraints by calculating an impulse and a pair of velocities to satisfy a contact constraint for a corresponding sub-body pair, such that the impulse is non-negative, said pair of velocities has the effect of applying said impulse equally and oppositely to said sub-body pair, and the resulting relative velocity at the contact is non-negative.

3. The computer system of claim 2, wherein said parallel iterative rigid body solver does not perform work after separation.

4. The computer system of claim 2, wherein said fixed joint constraints are enforced by averaging a plurality of sub-body velocities corresponding to said original object to define said average velocity, and assigning said average velocity to each of said plurality of sub-bodies.

5. The computer system of claim 2, wherein said parallel iterative rigid body solver is further operable to apply a frictional force to determine said velocity pair.

6. The computer system of claim 1, wherein each sub-body comprises an equally divided mass comprising said original mass divided by said total number.

7. The computer system of claim 1, wherein parallel iterative rigid body solver performs iteration of said solving contact constraints and said enforcing fixed joint constraints using said average velocity.

8. The computer system of claim 1, wherein said contact constraint solver is configured to solve contact constraints by assigning an initial velocity of said original object to each of said plurality of sub-bodies.

9. The computer system of claim 1, wherein said parallel iterative rigid body solver performs in parallel for a plurality of sub-bodies of one or more objects said enforcing fixed joint constraints.

10. The computer system of claim 1, wherein said one or more contact constraints corresponds to one or more contacts between said original object and one or more other objects.

11. The computer system of claim 1, wherein said processor performs computation across one or more processing threads, further wherein said processor utilizes a separate processing thread to compute contact constraints for each contact of the one or more contacts.

12. The computer system of claim 1, wherein said object mass splitter is further operable to split said original object into a plurality of sub-bodies such that each sub-body has the same mass distribution.

13. A computer system comprising:
a processor; and
memory coupled to said processor and having stored therein instructions that are executed by said computer system to perform a method for solving linear complementarity for rigid body simulation using a parallel iterative rigid body solver, said method comprising:
determining one or more patches associated with an original object having an original mass, wherein a patch comprises a pair of colliding objects including said original object and said patch defines a plurality of contact constraints affecting said pair of colliding objects;
splitting said original object by a total number of said patches into a plurality of sub-bodies, such that said sub-bodies of said original object comprise identical spatial extents, center of masses, and initial velocities, wherein each sub-body is assigned to a patch and comprises a sub-body mass defined by said original mass divided by said total number of said patches;
modeling said plurality of sub-bodies as a fixed joint;
solving contact constraints of said patches in parallel using a plurality of computing threads executed by said processor; and
enforcing fixed joint constraints such that positions and/or velocities of each sub-body are substantially identical.

14. The computer system of claim 13, wherein said solving contact constraints comprises:
calculating an impulse and a pair of velocities to satisfy a contact constraint for a corresponding sub-body pair, such that said impulse is non-negative, wherein said pair of velocities applies said impulse equally and oppositely to said sub-body pair, and wherein a resulting relative velocity at a contact is non-negative.

15. The computer system of claim 14, wherein said impulse is zero if said contact is separating.

16. The computer system of claim 14, wherein said enforcing fixed joint constraints exactly in said method comprises:
averaging a plurality of sub-body velocities corresponding to said original object to define said average velocity; and
assigning said average velocity to each of said plurality of sub-bodies.

17. The computer system of claim 11, wherein said method further comprises:
applying a frictional force to determine said resulting relative velocity.

18. The computer system of claim 13, wherein said method further comprises:
performing iteration of said solving contact constraints and said enforcing fixed joint constraints using said average velocity.

19. The computer system of claim 13, wherein said solving contact constraints comprises:
assigning an initial velocity of said original object to each of said plurality of sub-bodies.

20. A non-transitory computer-readable medium having computer-executable instructions that are executed by a processor of a computer system to perform a method for rigid body simulation using a parallel iterative rigid body solver, said method comprising:
determining one or more patches associated with an original object having an original mass, wherein a patch comprises a pair of colliding objects including said original object and said patch defines a plurality of contact constraints affecting said pair of colliding objects;
splitting said original object by a total number of said patches into a plurality of sub-bodies, such that said sub-bodies of said original object comprise identical spatial extents, center of masses, and initial velocities, said plurality of sub-bodies being modeled as a fixed joint, wherein each sub-body is assigned to a patch and comprises a sub-body mass defined by said original mass divided by said total number of said patches;
solving contact constrains of the patches in parallel using a plurality of computing threads executed by said processor; and
enforcing fixed joint constraints such that positions and/or velocities of each sub- body are substantially identical.

21. The non-transitory computer readable medium of claim 20, wherein said solving contact constrains of the patches in parallel comprises calculating an impulse and a pair of velocities to satisfy a contact constraint for a corresponding sub-body pair, such that said impulse is non-negative, said velocity pair is the effect of applying said impulse equally and oppositely to said sub-body pair, and the resulting relative velocity at said contact is non-negative.

22. The non-transitory computer readable medium of claim 21, wherein said method further comprising averaging a plurality of sub-body velocities corresponding to said original object to define said average velocity; and assigning said average velocity to each of said plurality of sub-bodies.

23. The non-transitory computer readable medium of claim 22, wherein said method further comprising iteratively performing said solving contact constraints and said enforcing fixed joint constraints using said average velocity vector.

* * * * *